Dec. 15, 1931.　　　　F. E. DYSON　　　　1,836,528
FOIL HOLDER FOR BURSTING VALVES
Filed July 12, 1929
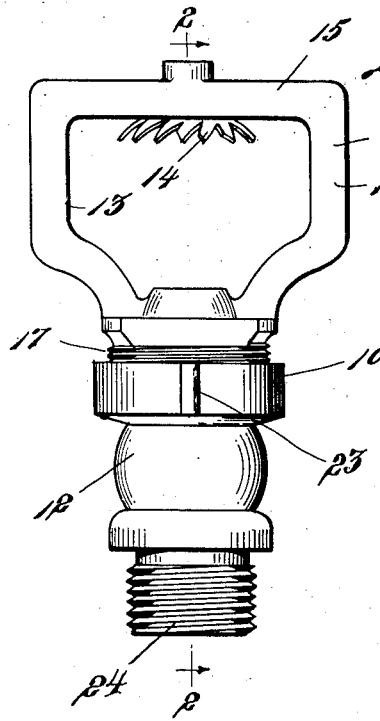
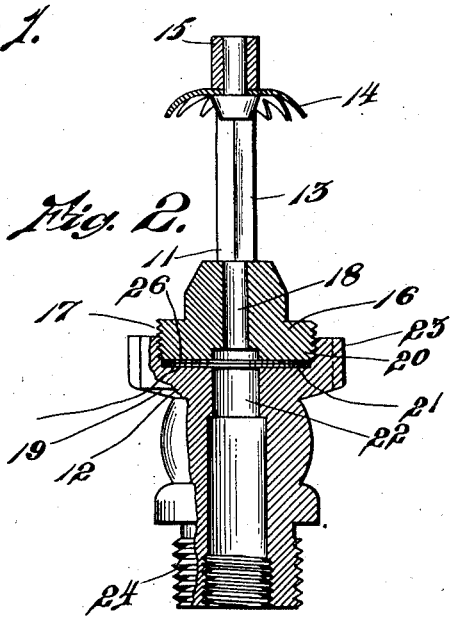
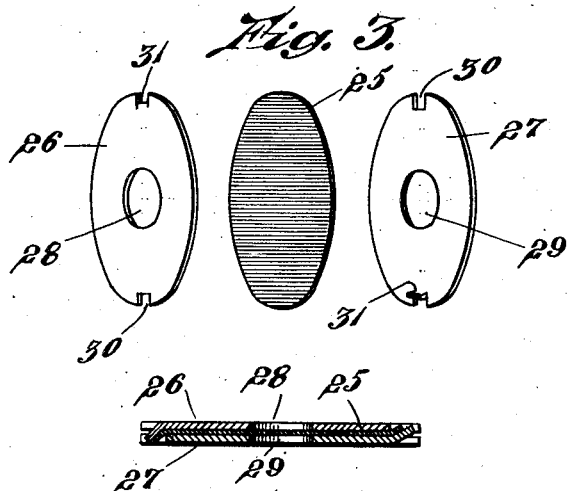
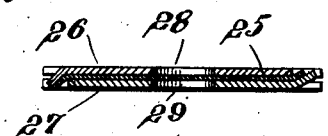
INVENTOR.
Frank E. Dyson
BY Barlow & Barlow
ATTORNEYS.

Patented Dec. 15, 1931

1,836,528

UNITED STATES PATENT OFFICE

FRANK E. DYSON, OF PROVIDENCE, RHODE ISLAND, ASSIGNOR TO AUTOMATIC EQUIPMENT COMPANY, OF ATTLEBORO, MASSACHUSETTS, A CORPORATION OF RHODE ISLAND

FOIL HOLDER FOR BURSTING VALVES

Application filed July 12, 1929. Serial No. 377,745.

My present invention relates to valves of the character having an element therein which is frangible or breakable with predetermined increase of pressure.

One object of my invention is to simplify and expedite the assembly of valves of this type.

Another object is to eliminate breakage or scoring of the frangible material during assembly.

A third object is to eliminate slippage between the frangible material and the holders therefor.

Other objects and advantageous features will be readily apparent from the following detailed description, in conjunction with the accompanying drawings, and will be particularly pointed out in the appended claims.

In the drawings:

Fig. 1 is an elevation of a valve of the frangible type,

Fig. 2 is a medial section thereof,

Fig. 3 is a perspective view of the frangible material and its holders, and

Fig. 4 is a sectional view of the frangible material and the holders, in locked relation.

Valves of the frangible or breakable type are formed with an outlet opening normally closed by a frangible diaphragm or sheet of a thickness varying from one-fourth to one and one-half thousandths of an inch, depending on the diaphragm material and the desired breakage pressure. The diaphragm material is preferably in the form of a foil, and may consist of aluminum, tin, or lead, or the like.

In assembling the foil diaphragm within the valve, it is customary to use two holders, one on each side of the foil, having aligned openings therein of predetermined size. One disadvantage in using these holders results from relative movement of the holders and the foil, this relative movement often scoring the foil so as to change and reduce the pressure necessary for breaking or bursting the foil and particularly occurs upon assembling the two parts or sections of the valve with the diaphragm between by the usual rotation to cause the threads on the two parts to interengage.

I preferably overcome this disadvantage by locking the holders against movement relative to the foil when the foil is positioned therebetween, thus permitting assembly of the holders and foil in the valve without scoring or damaging the foil in any way; and the following is a detailed description of a preferred structural embodiment of my invention.

Referring to the drawings, 10 designates a valve of the frangible type, in the present instance a sprinkler valve. The valve comprises an upper section 11 and a lower section 12, the upper section having two spaced sides 13 with a liquid disperser 14 positioned therebetween and riveted or otherwise secured to a bar 15 joining the spaced sides, and a depending section 16 exteriorly screw-threaded as at 17 and having a flow outlet 18 centrally disposed therein.

The lower section 12 has a flanged portion 19 interiorly screw-threaded as at 20 to engage with the screw threads 17 of the upper section, and extending outwardly from a base 21; a centrally disposed opening 22 in the lower section is aligned with the opening 18 of the upper section. Two ribs or projections 23 on the flanged portion 19 afford gripping means when the two sections are rotated with respect to each other, the lower section being also threaded at its lower end 24 for engagement with a fluid conduit or the like.

Mounted between the section 16 and the base 21 is a frangible foil 25 positioned between two foil holders 26, 27 having openings 28, 29 of predetermined size. Each holder has a slot 30 cut in the periphery thereof, and has a raised section 31 somewhat smaller than the slot and preferably diametrically disposed in relation thereto. The raised section of one holder is received into and locks with the slot of the other holder to secure the foil between the holders in non-slipping relationship.

In assembling my improved valve, the frangible element is positioned between the two holders, the two holders being set in their locking position; they are then inserted in contact with the base 21, and the upper section is then assembled into the lower section to tightly clamp the foil and holders, which cannot slip or turn with respect to each other.

While I have described one specific embodiment of my invention, it is obvious that the invention may be applied to any valve utilizing frangible or breakable elements, and that any structural changes or variations may be made within the scope of the invention as defined in the appended claims.

Having thus described my invention, I claim:

1. In a frangible type valve, an upper section, a lower section, said sections having aligned openings, cooperating means on said sections for detachably securing said sections together on relative rotation thereof, a frangible diaphragm between said sections normally closing communication of said openings, and means for protecting the diaphragm against destructive or relative rotation of said sections, said means comprising a member interposed between each face of the diaphragm and the adjacent section, said members being provided with interlocking means arranged to prevent relative rotation of said members during assembly.

2. In a frangible type valve, an upper section, a lower section, said sections having aligned openings, cooperating means on said sections for detachably securing said sections together on relative rotation thereof, a frangible metal foil diaphragm between said section normally closing communication of said openings, and means for protecting the diaphragm against destructive or relative rotation of said sections, said means comprising a member interposed between each face of the diaphragm and the adjacent section, said members being provided with interlocking means arranged to prevent relative rotation of said members during assembly.

3. In a frangible type valve, an upper section, a lower section, said sections having aligned openings, cooperating means on said sections for detachably securing said sections together on relative rotation thereof, a frangible diaphragm between said sections normally closing communication of said openings, holding devices for said diaphragm having aligned openings, and means locking said holding devices and said diaphragm against relative rotation during assembly.

4. In a frangible type valve, an upper section, a lower section, said sections having aligned openings, cooperating means on said section for detachably securing said sections together on relative rotation thereof, a frangible diaphragm of metal coil between said sections normally closing communication of said openings, holding devices for said diaphragm having aligned openings, and means locking said holding devices and said diaphragm against relative rotation during assembly.

5. In a frangible type valve, an upper section, a lower section, said sections having aligned openings, cooperating means on said sections for detachably securing said sections together on relative rotation thereof, a frangible diaphragm between said sections normally closing communication of said openings, holding devices for said diaphragm having aligned openings, and cooperating elements on said holding devices and said diaphragm for locking said holding devices and diaphragm against relative rotation during assembly.

6. In a frangible type valve, an upper section, a lower section, said sections having aligned openings, cooperating means on said sections for detachably securing said sections together on relative rotation thereof, a frangible diaphragm of metal boil between said sections normally closing communication of said openings, holding devices for said diaphragm having aligned openings, and cooperating elements on said holding devices and said diaphragm for locking said holding devices and diaphragm against relative rotation during assembly.

7. In a frangible type valve, an upper section, a lower section, said sections having aligned openings, cooperating means on said sections for detachably securing said sections together on relative rotation thereof, a frangible diaphragm between said sections normally closing communication of said openings, holding devices for said diaphragm having aligned openings, a raised section on one of said devices, and a slot on the other device for cooperation with said raised section to lock said holding devices and said diaphragm against relative rotation.

8. In a frangible type valve, an upper section, a lower section, said sections having aligned openings, cooperating means on said sections for detachably securing said sections together on relative rotation thereof, a frangible diaphragm of metal foil between said sections normally closing communication of said openings, holding devices for said diaphragm having aligned openings, a raised section on one of said devices, and a slot on the other device for cooperation with said raised section to lock said holding devices and said diaphragm against relative rotation.

9. In a frangible type valve, an upper section, a lower section, said sections having aligned openings, cooperating means on said sections for detachably securing said sections together on relative rotation thereof, a frangible diaphragm between said sections normally closing communication of said openings, holding devices for said diaphragm having aligned openings, a raised section and a slot on one device, and a slot and a raised section on the other device for cooperation with the raised section and slot of the first device to lock said holding devices and said diaphragm against relative rotation.

10. In a frangible type valve, an upper section, a lower section, said sections having aligned openings, cooperating means on said sections for detachably securing said sections together on relative rotation thereof, a frangible diaphragm of metal foil between said sections normally closing communication of said openings, holding devices for said diaphragm having aligned openings, a raised section and a slot on one device, and a slot and a raised section on the other device for cooperation with the raised section and slot of the first device to lock said holding devices and said diaphragm against relative rotation.

In testimony whereof I affix my signature.

FRANK E. DYSON.